United States Patent
McIlroy et al.

(10) Patent No.: US 11,441,028 B2
(45) Date of Patent: Sep. 13, 2022

(54) POLYAMIDE POLYMER COMPOSITIONS

(71) Applicant: SOLVAY SPECIALTY POLYMERS USA, LLC, Alpharetta, GA (US)

(72) Inventors: David McIlroy, Johns Creek, GA (US); Keshav S. Gautam, Duluth, GA (US); Raleigh L. Davis, Duluth, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 9 days.

(21) Appl. No.: 16/609,618

(22) PCT Filed: Apr. 26, 2018

(86) PCT No.: PCT/EP2018/060814
§ 371 (c)(1),
(2) Date: Oct. 30, 2019

(87) PCT Pub. No.: WO2018/202557
PCT Pub. Date: Nov. 8, 2018

(65) Prior Publication Data
US 2020/0062955 A1     Feb. 27, 2020

Related U.S. Application Data

(60) Provisional application No. 62/500,684, filed on May 3, 2017.

(30) Foreign Application Priority Data

Jun. 13, 2017   (EP) ..................................... 17175634

(51) Int. Cl.
*C08L 67/02*     (2006.01)

(52) U.S. Cl.
CPC ........... *C08L 67/02* (2013.01); *C08L 2205/03* (2013.01); *C08L 2205/12* (2013.01)

(58) Field of Classification Search
CPC ......... C08L 67/02–08; C08L 23/18–24; C08L 25/04–08; C08L 25/16; C08L 25/18; C08L 37/00; C08L 2205/03
See application file for complete search history.

(56) References Cited

U.S. PATENT DOCUMENTS

| | | | |
|---|---|---|---|
| 4,753,980 A | 6/1988 | Deyrup | |
| 4,877,848 A * | 10/1989 | Maresca | ............ C08K 5/1515 525/423 |
| 5,266,413 A | 11/1993 | Mills et al. | |
| 5,475,058 A | 12/1995 | Horiuchi et al. | |
| 6,984,694 B2 | 1/2006 | Blasius, Jr. et al. | |
| 8,987,368 B2 | 3/2015 | Schillo et al. | |
| 2009/0247699 A1 | 10/2009 | Buehler et al. | |
| 2015/0030793 A1 | 1/2015 | Miyabe et al. | |

FOREIGN PATENT DOCUMENTS

| EP | 2107083 A2 | 10/2009 |
|---|---|---|
| WO | 2015089720 A1 | 6/2015 |
| WO | 2017042042 | 3/2017 |

OTHER PUBLICATIONS

"Joncryl ADR-4300: Polymeric Chain Extender for CondensationThermoplastics," BASF Corporation, pp. 1-9, Aug. 17, 2006 (9 pages).
Al-Itry, R. et al., "Rheological, morphological, and interfacial properties of compatibilized PLA/PBAT blends," Rheol Acta, vol. 53, No. 7, pp. 501-517, Jul. 2014 (20 pages).

* cited by examiner

*Primary Examiner* — Ana L. Woodward
(74) *Attorney, Agent, or Firm* — Osha Bergman Watanabe & Burton LLP

(57) ABSTRACT

Described herein are polymer compositions including (i) a polymer blend containing an amorphous polyester copolymer and a semi-crystalline polyamide polymer ("polyester/polyamide blend"), (ii) 1 weight percent (wt. %) to 5 wt. % of an epoxy functionalized impact modifier and optionally (iii) one or more additives. It was surprisingly found that incorporation of a specific amount of an epoxy functionalized impact modifier into polymer compositions including a polyester/polyamide blend provided for significantly improved impact performance, relative to corresponding polymer compositions incorporating non-epoxy functionalized impact modifiers or corresponding polymer compositions free of impact modifiers. Due at least in part to the significantly improved impact performance and outstanding chemical resistance, the polymer compositions described herein can be incorporated in a wide variety of application settings, including but not limited to mobile electronic application settings.

11 Claims, No Drawings

POLYAMIDE POLYMER COMPOSITIONS

CROSS-REFERENCE TO RELATED APPLICATIONS

This application is a U.S. national stage entry under 35 U.S.C. § 371 of International Application No. PCT/EP2018/060814 filed Apr. 26, 2018, which claims priority to U.S. provisional patent application No. 62/500,684 filed on May 3, 2017 and to European patent application No. 17175634.9 filed on Jun. 13, 2017, the whole content of each of these applications being incorporated herein by reference for all purposes.

TECHNICAL FIELD OF THE INVENTION

The invention is directed to polymer compositions including a blend containing an amorphous polyester copolymer and a semi-crystalline polyamide polymer and an epoxy functionalized impact modifier. The invention is also directed to mobile electronic device components including such polymer compositions.

BACKGROUND OF THE INVENTION

Polymer compositions including a blend of amorphous polymers and semi-crystalline polymers are attractive in a wide variety of application settings. For example, due to their reduced weight, high impact performance and high chemical resistance, polymer compositions including blend of amorphous polymers and semi-crystalline polymers are especially attractive for mobile electronic device applications, as well as a wide variety of other application settings.

DETAILED DESCRIPTION OF THE INVENTION

Described herein are polymer compositions including (i) a polymer blend containing an amorphous polyester copolymer and a semi-crystalline polyamide polymer ("polyester/polyamide blend"), (ii) 1 weight percent (wt. %) to 5 wt. % of an epoxy functionalized impact modifier and optionally (iii) one or more additives. It was surprisingly found that incorporation of a specific amount of an epoxy functionalized impact modifier into polymer compositions including a polyester/polyamide blend provided for significantly improved impact performance, relative to corresponding polymer compositions incorporating non-epoxy functionalized impact modifiers or corresponding polymer compositions free of impact modifiers. Due at least in part to the significantly improved impact performance and outstanding chemical resistance, the polymer compositions described herein can be incorporated in a wide variety of application settings, including but not limited to mobile electronic application settings.

Polymer compositions including a blend of amorphous polyester copolymers and semi-crystalline polyamide polymers are attractive in a wide variety of application settings. In particular, polyester/polyamide blends can leverage the beneficial properties of both the amorphous polyester copolymer and the semi-crystalline polyamide polymer to address their respective deficiencies. For example, amorphous polyester copolymers generally have greater impact performance relative to semi-crystalline polyamide polymers, while simultaneously having lower chemical resistance. On the other hand, semi-crystalline polyamide polymers generally have improved chemical resistance relative to amorphous polyester copolymers, but also have reduced impact performance. However, while polyester/polyamide blends are attractive, the impact performance of amorphous polyester copolymer is significantly compromised, resulting in a polyester/polyamide blend have extremely poor impact performance.

It was surprisingly found that addition of a specific amount of an epoxy-functionalized impact modifier to polymer compositions containing a polyester/polyamide blend resulted in significantly improved impact performance. As demonstrated in the Examples below, the addition of a non-epoxy functionalized impact modifier to polymer compositions including a polyester/polyamide blend to increase impact performance did not significantly improve the impact performance of the blend. On the contrary, polymer compositions including a polyester/polyamide blend and a non-epoxy functionalized impact modifier had similar or decreased impact performance, relative to corresponding polymer compositions free of the impact modifier (see Examples below). It was surprisingly discovered that the addition of a specific amount of an epoxy-functionalized impact modifier to the polymer compositions including a polyester/polyamide blend significantly improved the impact performance of the polymer compositions.

The Polyester/Polyamide Blend

The polymer compositions of interest herein include a polyester/polyamide blend. The polyester/polyamide blend contains an amorphous polyester copolymer and a semi-crystalline polyamide polymer.

In some embodiments, the amorphous polyester copolymer, as described below, is present in a concentration of at least 65 wt. %, preferably at least 70 wt. %, most preferably at least 75 wt. %. Additionally or alternatively, the concentration of the amorphous polyester copolymer is no more than 95 wt. %, preferably no more than 93 wt. %, more preferably 90 wt. %, most preferably 85 wt. %. As used herein, wt. % is relative to the total weight of the polymer composition, unless explicitly noted otherwise. In some embodiments, the polyester/polyamide blend can include a plurality of distinct amorphous polyester copolymers, each as described below. In such embodiments, the total concentration of the plurality of distinct amorphous polyester copolymers is within the ranges described above.

In some embodiments, the semi-crystalline polyamide polymer is present in a concentration of at least 5 wt. %, preferably at least 10 wt. %, most preferably at least 15 wt. %. Additionally or alternatively, the concentration of the semi-crystalline polyamide polymer is no more than 25 wt. %, preferably no more than 20 wt. %. In some embodiments, the polyester/polyamide blend can include a plurality of distinct semi-crystalline polyamide polymers, as described below. In such embodiments, the total concentration of the plurality of distinct semi-crystalline polyamide polymers is within the respective ranges described above.

The Amorphous Polyester Copolymer

As used herein, a polyester copolymer refers to any polymer containing 2, distinct recurring units ($R_{PE1}$) and ($R_{PE2}$) with a combined concentration of at least 50 mol %, relative to the total number recurring units in the polyester copolymer, where each recurring unit ($R_{PE1}$) and ($R_{PE2}$) includes at least one ester group (—C(=O)—O—) and at least one cycloaliphatic group having from 1 to 20 carbon atoms. Furthermore, an amorphous polyester copolymer refers to a polyester copolymer having a heat of fusion ("$\Delta H_f$") of less than 5 Joules per gram ("J/g"). $\Delta H_f$ can be determined from the second heating scan according to ASTM D3418 standard method using differential scanning calorimetry ("DSC") with a heating and cooling rate of 20° C./min. in a nitrogen atmosphere. In some embodiments, the combined concentration of recurring units ($R_{PE1}$) and ($R_{PE2}$) is at least 60 mol %, at least 70 mol %, at least 80 mol %, at least 90 mol %, at least 95 mol %, at least 99 mol % or at least 99.9 mol %, relative to the total number of recurring units in the amorphous polyester copolymer.

In some embodiment, recurring units ($R_{PE1}$) and ($R_{PE2}$) are represented by the following two formulae, respectively:

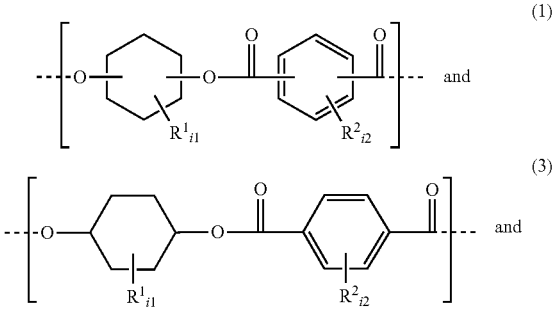

where $R^1$ to $R^4$, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium; $i^1$ is an integer from 1 to 10; $i^2$ and $i^4$ are independently selected integers from 1 to 4; $i^3$, at each instance, is an independently selected integer from 0 to 2; and n in an integer from 1 to 6, preferably 2. Preferably, $i^1$, $i^2$, $i^4$ and each $i^3$ are zero. Most preferably, $i^1$, $i^2$, $i^4$ and each $i^3$ are zero and n is 2. For clarity, when a subscript is zero, the corresponding moiety is not substituted. For example, referring to Formula (2), if n is 2 and one $i^3$ is 0 and the other $i^3$ is 1, the group —O—$(CR^3_{i3})_n$—O— can is represented by: —O—$CH_2$—$CHR^3$—O—. As another example and again referring to Formula (2), if $i^4$ is 2, the carbons on the corresponding benzyl ring are bonded to each of the two —CO— groups and two independently selected $R^4$ groups, with the remaining two carbons on the corresponding benzyl ring bonded to hydrogen atoms.

In some embodiment, recurring units ($R_{PE1}$) and ($R_{PE2}$) are represented by the following two formulae, respectively:

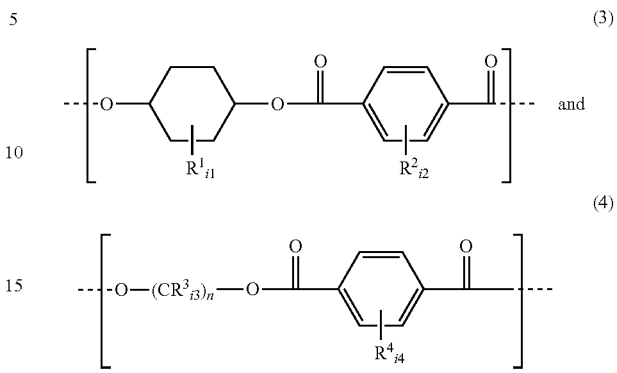

Preferably, $i^1$, $i^2$, $i^4$ and each $i^3$ are zero. Most preferably, $i^1$, $i^2$, $i^4$ and each $i^3$ are zero and n is 2. In some embodiments in which recurring units ($R_{PE1}$) and ($R_{PE2}$) are respectively represented by Formulae (3) and (4), the molar ratio of recurring unit ($R_{PE1}$) to recurring unit ($R_{PE2}$) (($R_{PE1}$):($R_{PE2}$))>0.5 ("PCTg"). In alternative embodiments, in which recurring units ($R_{PE1}$) and ($R_{PE2}$) are respectively represented by Formulae (3) and (4), ($R_{PE1}$):($R_{PE2}$)<0.5 ("PETg").

In some embodiment, recurring units ($R_{PE1}$) and ($R_{PE2}$) are represented by the following two formulae, respectively:

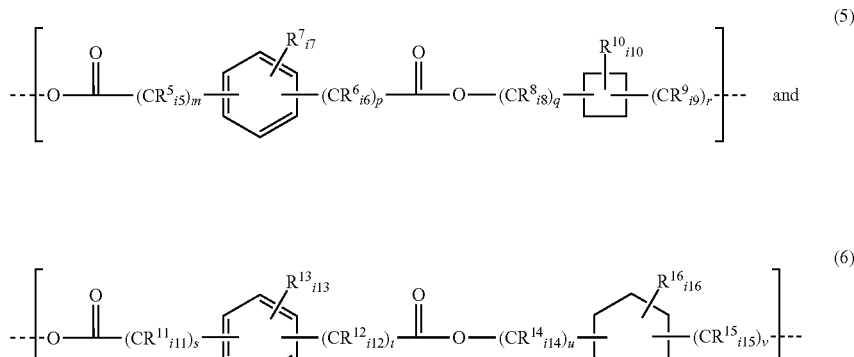

where $R^5$ to $R^{16}$, at each location, are independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium; $i^5$, $i^6$, $i^8$, $i^9$, $i^{11}$, $i^{12}$, $i^{14}$, and $i^{15}$, at each location, are independently selected integers from 0 to 2; $i^7$ and $i^{13}$ are independently selected integers from 0 to 4; $i^{10}$ is an integer from 0 to 6; $i^{16}$ is an integer from 0 to 10; and m, p, q, r, s, t, u and v are independently selected integers from 0 to 20, preferably 0 to 10. Preferably, $i^5$ to $i^{16}$, at each location, is 0; m and p are equal; q and r are equal; s and t are equal; and u and v are equal. Most preferably, additionally, m=p=0; q=r=0; s=t=0; and u=v=1.

In some embodiment, recurring units ($R_{PE1}$) and ($R_{PE2}$) are represented by the following two formulae, respectively:

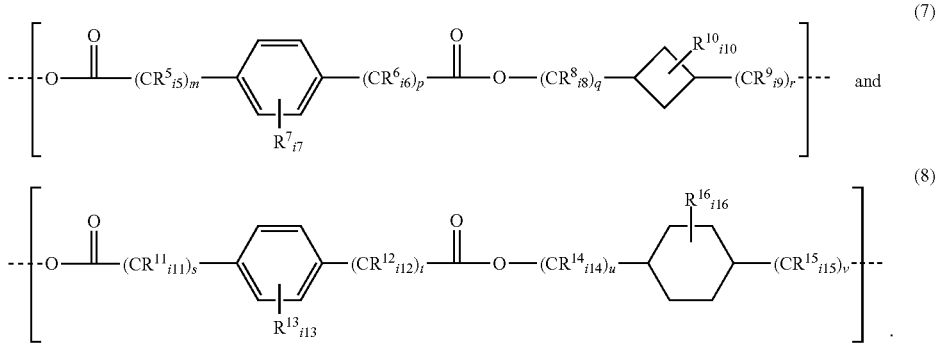

Preferably, $i^5$ to $i^{16}$, at each location, is 0; m and p are equal; q and r are equal; s and t are equal; and u and v are equal. Most preferably, additionally, m=p=0; q=r=0; s=t=0; and u=v=1.

In some embodiments, the amorphous polyester polymer has a glass transition temperature of at least 60° C., preferably at least 70° C., more preferably at least 75° C., most preferably at least 80° C. In some embodiments, additionally or alternatively, the amorphous polyester polymer has a glass transition temperature of no more than 120° C., preferably no more than 110° C., more preferably no more than 100° C., even more preferably no more than 95° C., most preferably no more than 95° C. The glass transition temperature can be measured from the second heating scan according to ASTM D3418 standard method using DSC with a heating and cooling rate of 20° C./min. in a nitrogen atmosphere.

In some embodiments, the amorphous polyester polymer has a number average molecular weight of at least 4,000 g/mol, preferably at least 5,000 g/mol. In some embodiments, additionally or alternatively, the amorphous polyester polymer can have a number average molecular weight of at most 14,000 g/mol, preferably at most 10,000 g/mol. In some embodiments, the amorphous polyester polymer has a weight average molecular weight of at least 10,000 g/mol. In some embodiments, additionally or alternatively, the amorphous polyester polymer has a weight average molecular weight of at most 25,000 g/mol, preferably at most 20,000 g/mol. Weight average molecular weight can be determined using gel permeation chromatography ("GPC") using a polyphthalamide standard, in conjunction with a refractive index detector and hexafluoroisopropanol ("HFIP").

As noted above, in some embodiments, the polyester/polyamide blend can include a plurality of distinct amorphous polyester copolymers. In such embodiments, each amorphous polyester copolymer includes at least 50 mol %, at least 60 mol %, at least 70 mol %, at least 80 mol %, at least 90 mol %, at least 95 mol %, at least 99 mol % or at least 99.9 mol % of a distinct recurring unit ($R_{PE1}$) or ($R_{PE2}$), as described above, relative to the total number of moles of recurring units in the amorphous polyester copolymer. Furthermore, the melting point and average molecular weight of each of the distinct amorphous polyester copolymers is within the ranges described above.

The Semi-Crystalline Polyamide

As used herein, a polyamide polymer refers to any polymer containing at least 50 mol % of a recurring unit ($R_{PA}$), relative to the total number of moles of recurring units in the polyamide, where recurring unit ($R_{PA}$) includes at least one amide group (—CONH—). Furthermore, a semi-crystalline polyamide refers to a polyamide polymer having a heat of fusion of at least 5 J/g. In some embodiments, the semi-crystalline polyamide polymer contains at least 60 mol %, at least 70 mol %, at least 80 mol %, at least 90 mol %, at least 95 mol %, at least 99 mol % or at least 99.9 mol % of recurring unit ($R_{PA}$), relative to the total number of moles of recurring units in the polyamide polymer.

In some embodiments, recurring unit ($R_{PA}$) is represented by a formula selected from the following group of formulae:

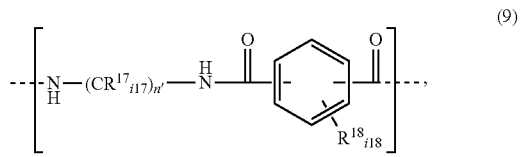

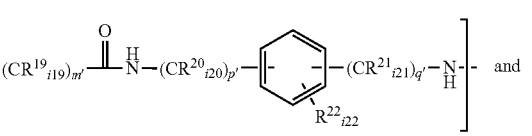

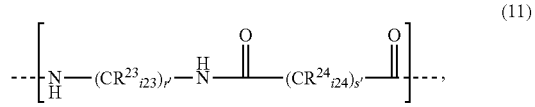

where $R^{17}$ to $R^{24}$, at each location, are independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine; $i^{17}$, $i^{19}$, $i^{20}$, $i^{21}$, $i^{23}$, and $i^{24}$, at each location, is an independently selected integer from 0 to 2; $i^{18}$ and $i^{22}$ are independently selected integers from 0 to 4; n' and m' are independently selected integers from 4 to 12, preferably 4 to 10, more preferably 4 to 8, most preferably 6; r' and s' are independently selected integers from 4 to 18, preferably 4 to 12, more preferably 4 to 10, still more preferably 4 to 8, most preferably 6; p' and q' are independently selected integers from from 1 to 6, preferably 1. When present at a location, $R^{17}$ to $R^{24}$ are preferably alkyls independently represented by a formula —$(CH_2)_{t'}CH_3$, where t' is an integer from 0 to 5 preferably from 0 to 2, more preferably from 0 to 1 and most preferably q is zero.

In some embodiments, recurring unit ($R_{PA}$) is represented by the following formula:

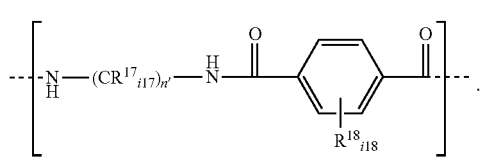
(12)

In some such embodiments, i18 is zero and each i17 is zero. Additionally or alternatively, n' is preferably 4 to 10, more preferably 4 to 8, most preferably 6. In some embodiments, recurring unit ($R_{PA}$) is represented by the following formula:

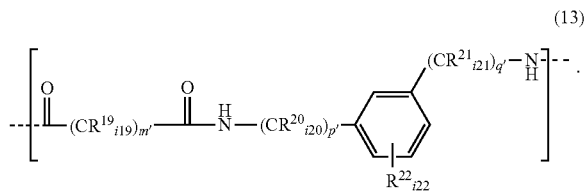
(13)

In some such embodiments, $i^{22}$ is zero and each $i^{19}$, $i^{20}$, and $i^{21}$ are zero. Additionally or alternatively, p' and q' can be 1 and m' is preferably 4 to 10, more preferably 4 to 8, most preferably 6. In some embodiments, recurring unit ($R_{PA}$) is represented by Formula (11), where each $i^{23}$ and $i^{24}$ are zero. In some such embodiments, r' and s' are independently selected integers from 4 to 18, preferably 4 to 12, more preferably 4 to 10, still more preferably 4 to 8, most preferably 6.

In some embodiments, the semi-crystalline polyamide polymer has a melting point, of at least 220° C., preferably at least 230° C. Additionally or alternatively, the semi-crystalline polyamide polymer has a melting point of at most 350° C., at most 340° C., at most 330° C. or at most 320° C. The melting temperature can be measured from the second heating scan according to ASTM D3418 standard method using DSC with a heating and cooling rate of 20° C./min. in a nitrogen atmosphere.

In some embodiments, the semi-crystalline polyamide polymer has an intrinsic viscosity of less than 0.95, preferably less than 0.90, more preferably less than 0.85, still more preferably less than 0.80, and most preferably less than 0.75 when measured in a phenol/tetrachloroethane 60/40 (wt/wt) mixture at a temperature of Tm+15° C., Tm being the melting temperature of the aromatic polyamide.

In some embodiments, the semi-crystalline polyamide polymer has a number average molecular weight of at least 4,000 g/mol, preferably at least 5,000 g/mol, most preferably at least 10,000 g/mol. In some embodiments, additionally or alternatively, the semi-crystalline polyamide polymer can have a number average molecular weight of at most 35,000 g/mol, preferably at most 25,000 g/mol, most preferably at most 20,000 g/mol. In some embodiments, the semi-crystalline polyamide polymer has a weight average molecular weight of at least 20,000 g/mol, preferably at least 30,000 g/mol. In some embodiments, additionally or alternatively, the semi-crystalline polyamide polymer has a weight average molecular weight of at most 65,000 g/mol, preferably at most 50,000 g/mol. Weight average molecular weight can be determined using GPC as described above.

As noted above, in some embodiments, the polyester/polyamide blend can include a plurality of distinct semi-crystalline polyamide polymers. In such embodiments, each semi-crystalline polyamide polymers includes at least 50 mol %, at least 60 mol %, at least 70 mol %, at least 80 mol %, at least 90 mol %, at least 95 mol %, at least 99 mol % or at least 99.9 mol % of a distinct recurring unit ($R_{PA}$), as described above, relative to the total number of moles of recurring units in the semi-crystalline polyamide polymer. Furthermore, the melting point and average molecular weight of each of the distinct semi-crystalline polyamide polymers is within the ranges described above.

The Epoxy Functionalized Impact Modifier

In addition to the polyester/polyamide blend, the polymer composition contains an epoxy functionalized impact modifier. As noted above, it was surprisingly discovered that incorporation of epoxy functionalized impact modifiers into polymer composition including a polyester/polyamide blend provided for significantly improved impact performance.

The epoxy functionalized impact modifier contains recurring units ($R_S$) and ($R_G$), represented by the following formulae respectively:

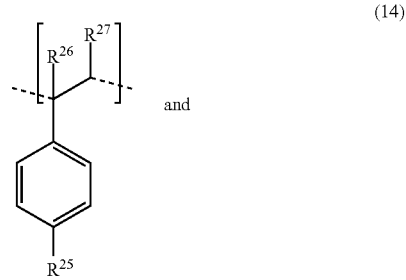
(14)

and

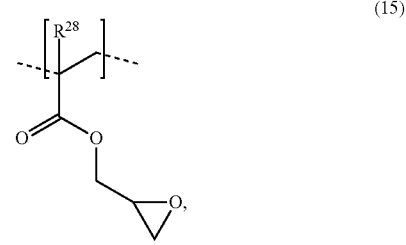
(15)

where $R^{25}$ to $R^{28}$ are independently selected from the group consisting of a hydrogen or an alkyl group having 1 to 12 carbon atoms, preferably 1 to 6 carbon atoms. Preferably, when any of $R^{25}$ to $R^{28}$ is an alkyl group, it is selected from a methyl group, an ethyl group and a propyl group, preferably a methyl group. In some embodiments, the number of recurring unit ($R_S$) and number of recurring unit ($R_G$) is an independently selected integer from 1 to 35. Additionally or alternatively, the total number of recurring units ($R_S$) and ($R_G$) can be from 10 to 70, preferably from 15 to 60.

In some embodiments, the epoxy functionalized impact modifier further contains a recurring unit ($R_A$) represented by the following formula:

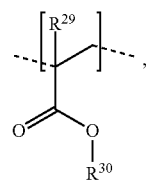

(16)

where $R^{29}$ is selected from the group consisting of a hydrogen or an alkyl group having 1 to 12 carbon atoms, preferably 1 to 6 carbon atoms. Preferably, when $R^{29}$ is an alkyl group, it is selected from a methyl group, an ethyl group and a propyl group, preferably a methyl group. $R^{30}$ is an alkyl group containing 1 to 12 carbon atoms, preferably 1 to 6 carbon atoms. Preferably $R^{30}$ is a methyl group, an ethyl group or a propyl group, most preferably a methyl group. In some embodiments in which the epoxy functionalized impact modifier further contains recurring unit ($R_A$), the number of recurring unit ($R_S$), number of recurring unit ($R_G$) and number of recurring unit ($R_A$) is an independently selected integer from 1 to 20. Preferably, the total number of recurring units ($R_S$) and ($R_G$) is greater than 10 and the number of recurring unit ($R_G$) is greater than 3.

The concentration of the epoxy functionalized impact modifier is from 1 wt. % to 5 wt. %, preferably 2 wt. % to 4 wt. %. As demonstrated in the Examples, the surprising improvement in the impact performance of the polymer composition is not observed at epoxy functionalized impact modifier concentrations less than 1 wt. %.

Additives

In some embodiments, the polymer composition further includes one or more additives. The one or more additives include, but are not limited to, UV absorbers; mineral fillers including, but not limited to, talc, mica wollastonite and kaolin; light and heat stabilizers; antioxidants; lubricants; processing aids; plasticizers; flow modifiers; flame retardants; pigments, dyes and colorants, including, but not limited to, TiO2, carbon black, zinc sulfide, barium sulfate, zinc oxide and ferric oxide; anti-static agents; extenders; and metal deactivators. When present, the total concentration of the one or more additives is at least 0 wt. %, preferably at least 0.5 wt. %, most preferably at least 1 wt. %. Additionally or alternatively, the total concentration of additives can be no more than 20 wt. %, preferably no more than 15 wt. %, more preferably no more than 10 wt. %, even more preferably no more than 5 wt. %, still more preferably no more than 4 wt. %, most preferably no more than 3 wt. %.

Mobile Electronic Device Components

The polymer compositions described herein can be advantageously incorporated into mobile electronic device components. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, global position system receivers, and portable game consoles.

In some embodiments, at least a portion of the mobile electronic device component can be exposed to the external environment of the mobile electronic device (e.g., at least a portion of the component is in contact with the environment external to the mobile electronic device). For example, at least a portion of the device component can form at least a portion of the external housing of the mobile electronic device. In some such embodiments, the device component can be a full or partial "frame" around the periphery of the mobile electronic device, a beam in the form of a lattice work, or a combination thereof. As another example, at least a portion of the device component can form at least a portion of an input device. In some such embodiments, a button of the electronic device can include the device component. In some embodiments, the device component can be fully enclosed by the electronic device (e.g., the device component is not visible from an observation point external to the mobile electronic device).

In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

The device components of the mobile electronic device can be fabricated using methods well known in the art. For example, the mobile electronic device components can be fabricated by methods including, but not limited to, injection molding, blow molding or extrusion molding. In some embodiments, the polymer compositions can be formed into pellets (e.g., having a substantially cylindrical body between two ends) by methods known in the art including, but not limited to, injection molding. In some such embodiments, mobile electronic device components can be fabricated from the pellets.

In some embodiments, the mobile electronic device components can be coated with metal by methods well known in the art, including but not limited to, vacuum deposition (including various methods of heating the metal to be deposited), electroless plating, electroplating, chemical vapor deposition, metal sputtering, and electron beam deposition. Although the metal may adhere well to the device components without any special treatment, in some embodiments, methods well known in the art can be used to improve adhesion. Such methods include, but are not limited to, abrasion to roughen the synthetic resin surface, addition of adhesion promotion agents, chemical etching, functionalization of the surface by exposure to plasma and/or radiation (for instance laser or UV radiation) or any combination of these. Also, in some embodiments, metal coating methods can include at least one step where the mobile electronic device component is immersed in an acid bath. More than one metal or metal alloy can be plated onto the device components containing the polymer composition. For example, one metal or alloy can be plated directly onto the synthetic resin surface because of its good adhesion, and another metal or alloy can be plated on top of the previous plating because it has a higher strength and/or stiffness. Useful coating metals and alloys include, but are not limited to, copper, nickel, iron-nickel, cobalt, cobalt-nickel, and chromium, and combinations of these in distinct layers. In some embodiments, the surface of the mobile electronic device component can be fully or partially coated with metal. In some embodiments, more than about 50% or about 100% of the surface area of the device component can be metal coated. In different areas of the device component the thickness and/or the number of metal layers, and/or the composition of the metal layers may vary. The metal may be coated in patterns to efficiently improve one or more properties in certain sections of the mobile electronic device component.

Should the disclosure of any patents, patent applications, and publications which are incorporated herein by reference conflict with the description of the present application to the extent that it may render a term unclear, the present description shall take precedence.

include polymer blends, but only a single polymer. Samples CE6 and CE8 contained an amorphous polyester copolymer, sample CE7 contained a polycarbonate polyester and samples CE9 contained a semi-crystalline polyamide polymer. The amorphous polyester used in the samples was obtained from Eastman Chemical Company under the trade name Tritan™ Copolyester TX1000 (a copolymer having recurring units according to Formulae (5) and (6)). The semi-crystalline polymer used in the samples was was MXD6. The polycarbonate polymer was obtained from Covestro under the trade name Makrolon® 3300.

In addition to the polymers, some of the samples included an impact modifier and one or more additives. The impact modifier was either an epoxy-functionalized impact modifier ("Impact Modifier 1") or a non-epoxy functionalized impact modifier ("Impact Modifier 2"). The epoxy-functionalized impact modifier was obtained from BASF under the trade name JONCRYL® ADR-4300 and the non-epoxy functionalized impact modifier was obtained from The Dow Chemical Company under the trade name PARALOID™ EXL-3361 (a pelletized butyl acrylate-based impact modifier). The one or more additives was selected from calcium stearate, a processing stabilizer (obtained from Clariant under the trade name Hostanox® P-EPQ® Powder), an antioxidant (obtained from BASF under the trade name Irganox® B 1171), and $TiO_2$. Sample parameters are displayed in Table 1, below. In Table 1, wt. % is relative to the total weight of the corresponding sample.

TABLE 1

| Sample No. | C1 | C2 | CE1 | CE2 | CE3 | CE4 | CE5 | CE6 | CE7 | CE8 | CE9 |
|---|---|---|---|---|---|---|---|---|---|---|---|
| Amorphous Polyester (wt. %) | 83 | 78 | 84.8 | 84.8 | 83 | 78 | 79.8 | 100 | | 98 | |
| Semi-Crystalline Polyamide (wt. %) | 15 | 20 | 15 | 15 | 15 | 20 | 20 | | | | 98 |
| Impact Modifier 1 (wt. %) | 2 | 2 | 0.2 | | | | | | | 2 | 2 |
| Impact Modifier 2 (wt. %) | | | | 0.2 | 2 | 2 | | | | | |
| Polycarbonate (wt. %) | | | | | | | | | 100 | | |
| Calcium stearate (wt. %) | 0.1 | 0.1 | 0.1 | 0.1 | 0.1 | 0.1 | 0.1 | 0.1 | 0.1 | | |
| Stabilizer (wt. %) | 0.1 | 0.1 | 0.1 | 0.1 | 0.1 | 0.1 | 0.1 | 0.1 | 0.1 | | |
| Antioxidant (wt. %) | 0.2 | 0.2 | 0.2 | 0.2 | 0.2 | 0.2 | 0.2 | 0.2 | 0.2 | | |
| $TiO_2$ (wt. %) | 2 | 2 | 2 | 2 | 2 | 2 | 2 | 2 | 2 | | |

EXAMPLES

The following examples demonstrate the mechanical performance of the polyester/polyamnide polymer compositions.

To demonstrate performance 11 samples were formed. Samples C1, C2 and CE1 to CE5 contained a polymer blend including an amorphous polyester copolymer and a semi-crystalline polyamide polymer. Samples CE6 to CE9 did not Mechanical performance was tested by measuring notched-Izod impact resistance, modulus of elasticity ("E"), nominal tensile strain at break, tensile elongation at yield, tensile strength at break, and tensile strength at yield. Tensile properties were measured using an ASTM Type I tensile bar according to ASTM D638. Impact performance was measured using a standard ASTM Izod test specimen according to ASTM D256. The results of mechanical testing are displayed in Table 2, below.

TABLE 2

| Sample No. | | C1 | C2 | CE1 | CE2 | CE3 | CE4 | CE5 | CE6 | CE7 | CE8 | CE9 |
|---|---|---|---|---|---|---|---|---|---|---|---|---|
| Notched Izod (ft-lb/in) | Complete Break | — | — | 1.52 | 1.11 | 1.02 | 0.996 | 1.07 | | | | 0.496 |
| | Partial Break | 24.9 | 27.1 | — | — | — | — | — | 17.2 | 14 | 18.9 | |
| E (KSI) | | 276 | 291 | 277 | 279 | 274 | 289 | 286 | 239 | 346 | 240 | 699 |
| Nominal Tensile Strain at Break (%) | | 100 | 99 | 100 | 120 | 110 | 82 | 81 | 73 | 50 | 31 | 2.1 |
| Tensile Elongation at Yield (%) | | 5.5 | 5.2 | 5.4 | 5.5 | 5.4 | 5 | 4.9 | 6.4 | 5.9 | 6.5 | No |

TABLE 2-continued

| Sample No. | C1 | C2 | CE1 | CE2 | CE3 | CE4 | CE5 | CE6 | CE7 | CE8 | CE9 |
|---|---|---|---|---|---|---|---|---|---|---|---|
| Tensile Strength at Break (PSI) | 6810 | 6670 | 6700 | 6770 | 6550 | 5560 | 5890 | 5270 | 7670 | 5210 | |
| Tensile Strength at Yield (PSI) | 7170 | 7410 | 7160 | 7140 | 7020 | 7290 | 7380 | 6670 | 8700 | 6710 | |

For the samples tested, the samples including a polyester/polyamide blend with an epoxy-functionalized impact modifier has surprisingly increased impact performance, relative to corresponding samples free of the epoxy-functionalized impact modifier. As demonstrated by comparison of CE6 with CE5, addition of a semi-crystalline polyamide to an amorphous polyester significantly reduces the impact performance of the corresponding polymer composition. For example, CE6 (amorphous polyester) resulted in a partial break during impact testing at 17.2 foot-pounds per inch ("ft-lbs/in"), while sample CE5 (polyester/polyamide blend) resulted in a full-break at 1.07 ft-lbs/in. Furthermore, the addition of a non-epoxy functionalized impact modifier to the samples including polyester/polyamide blends did not have any notable effect on the impact performance. Comparison of CE2 to CE4 (each including a polyester/polyamide blend and a non-epoxy functionalized impact modifier) resulted in complete break during impact testing at between 0.996 ft-lbs/in to 1.11 ft-lbs/in, substantially similar to the results noted above for CE5.

However, as demonstrated by comparison of C1 and C2 with CE2 to CE4, addition of an epoxy-functionalized impact modifier to the polymer compositions include a polyester/polyamide blend unexpectedly resulted in significantly improved impact performance. For example, C1 and C2 (both including an epoxy-functionalized impact modifier) resulted in partial-break during impact testing at 24.9 ft-lbs/in and 27.1 ft-lbs/in, respectively, demonstrating significant improvement in impact performance relative to CE2 to CE4 (both including a non-epoxy functionalized impact modifier). Additionally, comparison of C1 to CE1 demonstrates that the surprising improvement in impact performance was not observed when the epoxy functionalized impact modifier was present in a concentration of 0.2 wt. %.

Furthermore, comparison of C1 and C2 with CE8 and CE9 demonstrate the synergistic improvement in impact performance with respect to polyester/polyamide blends incorporating an epoxy functionalized impact modifier. For example CE8 (amorphous polyester and epoxy functionalized impact modifier) and CE9 (semi-crystalline polyamide and epoxy functionalized impact modifier) had a partial break at 18.9 ft-lbs/in and complete break at 0.496 ft-lbs/in, respectively. On the other hand, as noted above, C1 and C2 resulted in partial-break during impact testing at 24.9 ft-lbs/in and 27.1 ft-lbs/in.

The invention claimed is:
1. A polymer composition comprising:
   an amorphous polyester copolymer
   a semi-crystalline polyamide; and
   from 1 wt. % to 5 wt. % of an epoxy functionalized impact modifier;
   wherein wt. % is relative to the total weight of the polymer composition,
   wherein the amorphous polyester copolymer comprises recurring units ($R_{PE1}$) and ($R_{PE2}$) represented by the following formulae, respectively,

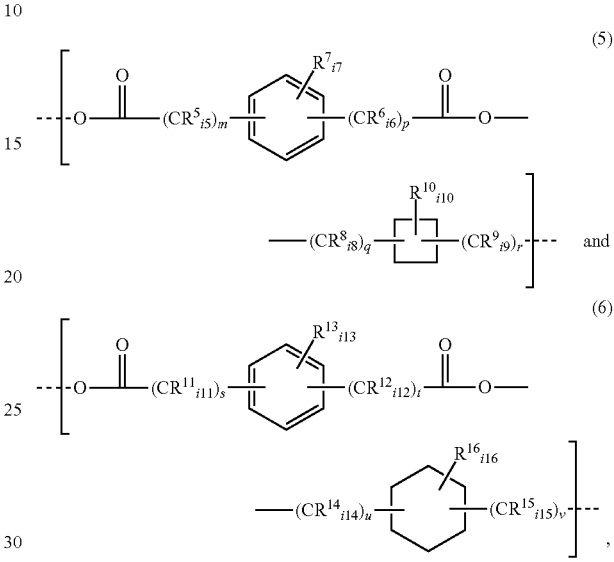

wherein:
$R^5$ to $R^{16}$, at each location, are independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium;

$i^5$, $i^6$, $i^8$, $i^9$, $i^{11}$, $i^{14}$, and $i^{15}$, at each location, are independently selected integers from 0 to 2;

$i^7$ and $i^{13}$ are independently selected integers from 0 to 4;

$i^{10}$ is an integer from 0 to 6;

$i^{16}$ is an integer from 0 to 10; and m, p, q, r, s, t, u and v are independently selected integers from 0 to 20.

2. The polymer composition of claim 1, wherein the epoxy-functionalized impact modifier includes recurring units ($R_A$), ($R_S$), and ($R_G$) represented by the following formulae respectively:

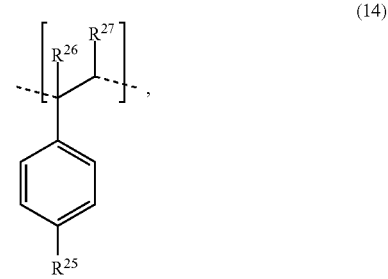

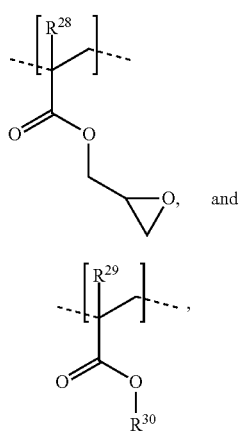

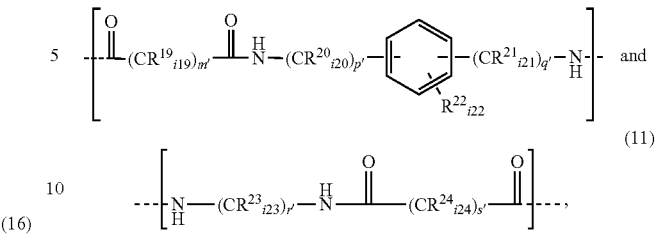

wherein
R²⁵ to R²⁹ are independently selected from the group consisting of a hydrogen or an alkyl having 1 to 12 carbon atoms, and
R³⁰ is an alkyl group containing 1 to 12 carbon atoms.

3. The polymer composition of claim 2, wherein $R^{25}$ to $R^{30}$ are independently selected from the group consisting of a methyl group, an ethyl group and a propyl group.

4. The polymer composition of claim 1, wherein recurring units ($R_{PE1}$) and ($R_{PE2}$) represented by the following formulae, respectively:

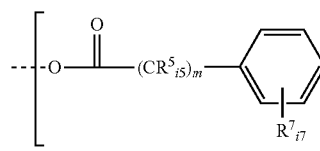

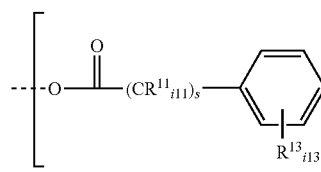

5. The polymer composition of claim 1, wherein, $i^5$ to $i^{16}$, at each location, is 0; m=p=0; q=r=0; s=t=0; and u=v=1.

6. The polymer composition of claim 1, wherein the semi-crystalline polyamide polymer comprises a recurring unit ($R_{P4}$) represented by a formula selected from the following group of formulae:

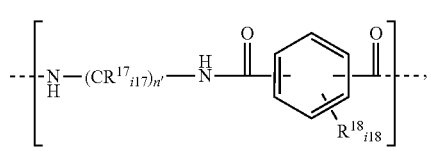

wherein
$R^{17}$ to $R^{24}$, at each location, are independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine;
$i^{17}$, $i^{19}$, $i^{20}$, $i^{21}$, $i^{23}$, and $i^{24}$, at each location, is an independently selected integer from 0 to 2;
$i^{18}$ and $i^{22}$ are independently selected integers from 0 to 4;
n' and m' are independently selected integers from 4 to 12;
r' and s' are independently selected integers from 4 to 18;
p' and q' are independently selected integers from 1 to 6.

7. The polymer composition of claim 6, wherein recurring unit ($R_{P4}$) represented by a formula selected from the following group of formulae:

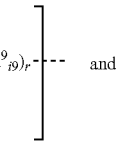

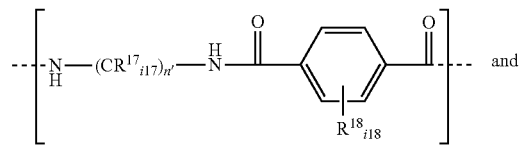

8. The polymer composition of claim 6, wherein $i^{17}$, $i^{19}$, $i^{20}$, $i^{21}$, $i^{23}$, and $i^{24}$, at each location, is zero and wherein $i^{18}$ and $i^{22}$ are zero.

9. The polymer composition of claim 1, wherein the concentration of the amorphous polyester copolymer is at least 65 wt. % and is no more than 95 wt. % relative to the total weight of the polymer composition.

10. The polymer composition of claim 1, wherein the concentration of the semi-crystalline polyamide polymer is at least 5 wt. % and is no more than 25 wt. % relative to the total weight of the polymer composition.

11. A mobile electronic device component comprising the polymer composition of any one of claim 1.

* * * * *